Patented June 23, 1936

2,045,323

UNITED STATES PATENT OFFICE 2,045,323

AZO-DYESTUFFS

Friedrich Felix and Wilhelm Huber, Basel, Switzerland, assignors to Society of Chemical Industry in Basle, Basel, Switzerland No Drawing. Application June 8, 1933, Serial No. 674,966. In Switzerland July 9, 1932

11 Claims. (Cl. 260—96)

According to this invention valuable dyestuffs are obtained by introducing into any azo-body at least one

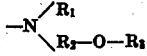

group, wherein $R_1$ stands for hydrogen, alkyl, or aralkyl or acidyl, $R_2$ for an aliphatic hydrocarbon radical consisting of at least two carbon atoms, and $R_3$ for alkyl or aralkyl. Here and throughout the specification alkyl not only means the homologues of the $CH_3$— and $C_2H_5$— groups, but also the substituted radicals thereof, such as $$C_2H_4Cl,\ C_2H_4N(CH_3)_2,\ C_2H_4SO_3H,$$

and so forth. The term alkyl comprises also radicals with double bonds, such as, for example, the allyl radical. The process may consist in causing a diazo-compound of an aromatic base to react with a coupling component which contains at least one alkyloxy alkylamino-group, aralkyloxyalkylamino-group or alkyleneoxyalkylamino-group. Another form of the process consists in substituting in an aminoazo-dyestuff the primary or secondary amino-group by subsequent treatment with an alkylether which still contains at least one group capable of reacting with the primary or secondary amino-group of the dyestuff.

This may be done, for example, by causing the dyestuff which contains a primary or secondary amino-group to react with an aryl-sulfonic acid ester or sulfonic acid ester of a polyhydric alcohol with 2 or more C-atoms containing at least one etherified OH-group, such as

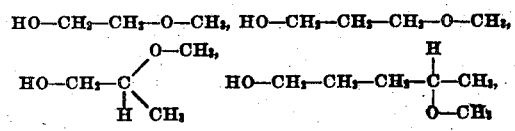

in which formulas another alkyl-group, such as, for example, the $C_2H_5$-group, or a group containing still more carbon atoms, may also replace the $CH_3$-group linked to the O-atom. Further, the hydrogen halide acid ester of the partially etherified polyhydric alcohol may be used. Further, in the case of dyestuffs having ω-oxalkylamino-groups which are obtainable by means of compounds, such as

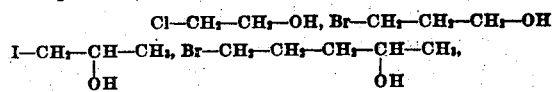

these groups can be etherified; or dyestuffs which contain an ω-halogenalkylamino-group, for instance a —NH—CH₂—CH₂—Br-group or a —NH—CH₂—CH₂—CH₂—Br - group, may be treated with an alcoholate.

The dyestuffs thus obtained have the general formula

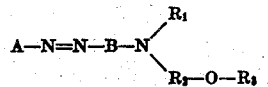

wherein A and B stand for nuclei of the benzene or naphthalene series, and $R_1$, $R_2$ and $R_3$ have the meanings already indicated above. These dyestuffs form yellow, orange, brown, red, violet blue or black powders, and dissolve in solvents, such as water (if the dyestuffs contain sulfonic groups capable of forming alkali salts), or acetic ester or glacial acetic acid or pyridine (if the dyestuffs contain no $SO_3H$-group of COOH-group), to yellow, orange, brown, red, violet, blue or black solutions. They dye textiles, such as wool, silk, cotton, artificial silk from regenerated cellulose, cellulose esters and cellulose ethers and artificial silk consisting of such materials, in the shades indicated above.

As hereinbefore mentioned these dyestuffs may be obtained by combining any diazotizing components with such coupling components which contain the group

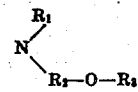

wherein $R_1$, $R_2$ and $R_3$ have the meaning already indicated above. In this case there may be used as diazotizing components aniline, toluidine, nitraniline, particularly para-nitraniline, chloraniline or a sulfonic or carboxylic acid of any of these, for instance sulfanilic acid, metanilic acid or the like, nitrochloroaniline, particularly 2-chloro-4-nitraniline, 2,6-dichloro - 4 - nitraniline, anisidine, nitroanisidines and chloroanisidines, particularly 4-nitro-ortho-anisidine; dinitroanilines, particularly 2,4-dinitraniline, dinitrochloroanilines, particularly 2,4-dinitro-6-chloraniline; ortho-aminophenol or its homologues and analogues, such as ortho-aminocresols, nitroaminophenols, particularly 5-nitro-ortho-aminophenol, chloro-aminophenols and their sulfonic acids, naphthylamines, naphthylamine sulfonic acids, such as 1,8-aminonaphthol sulfonic acid, 1,8-aminonaphthol-3,6-disulfonic acid, or the toluene-sulfonic acid esters thereof; aminoazobenzene and its homologues and analogues, such as aminoazotoluene, aminoazobenzene-sulfonic acids, aminoazo-dyestuffs, such as the azo-dyestuff from 1 mol. of diazotized analine sulfonic acid or naphthylamine sulfonic acid and one mol. of a middle component, such as aniline, cresidine, α-naphthylamine, α-naphthylamine-6- or 7-sulfonic acids, 1-amino-2-methoxynaphthalene, and so forth, or still more complicated diazo-compounds, as illustrated below.

With the diazotizing components just mentioned there are suitable as coupling components any bases, capable of coupling, which contain at the nitrogen atom, for instance, an alkylether, residue, for instance N(β-methoxyethyl)-aniline of the formula

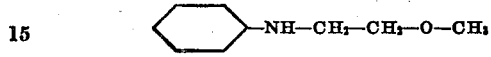

N(β-ethoxyethyl)-aniline, N-methyl-N(β-methoxyethyl)-aniline or N-methyl-N(β-ethoxyethyl)-aniline, the formulas of the last two being

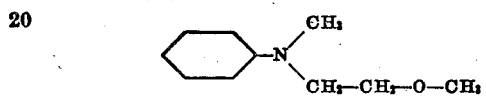

and

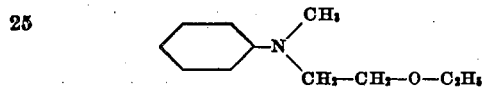

respectively, N-ethyl-N(β-methoxyethyl)-aniline or N-ethyl-N(β-ethoxyethyl)-aniline, N-(β-methoxyethyl)-3-methyl-aniline of the formula

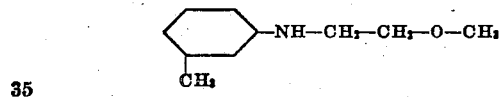

or N(β-ethoxyethyl)-3-methyl-aniline, N(β-methoxyethyl)-2-methoxy-5-methyl-aniline of the formula

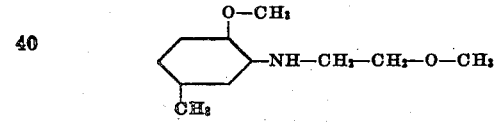

or N(β-ethoxyethyl)-2-methoxy-5-methyl-aniline, N(β-methoxyethyl)-2,5-dimethoxy-aniline of the formula

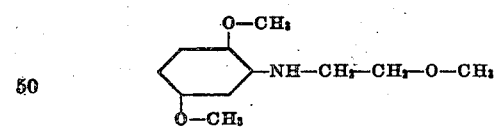

or N(β-ethoxyethyl)-2,5-dimethoxy-aniline, N-ethyl-N(β-methoxyethyl)-2-methoxy-5-methyl-analine of the formula

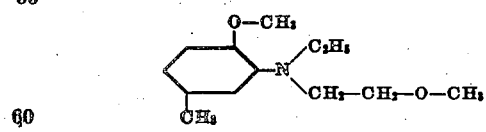

or N-ethyl-N(β-ethoxyethyl)-2-methoxy-5-methyl-aniline, N-ethyl-N(β-methoxyethyl)-2,5-dimethoxy-aniline of the formula

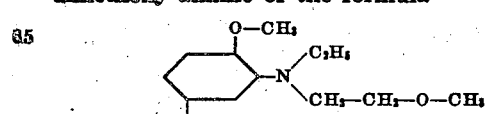

or N-ethyl-N(β-ethoxyethyl)-2,5-dimethoxy-aniline, or N(di-β-methoxyethyl)-aniline of the formula

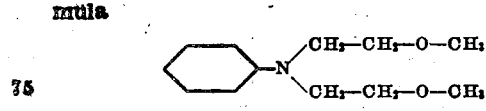

or N(β-methoxyethyl)-1-aminonaphthalene of the formula

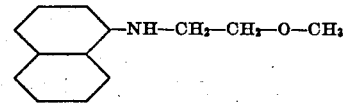

or N(β-methoxyethyl)-2-aminonaphthalene, further derivatives of diaminobenzenes, such as, for example, the compound of the formula

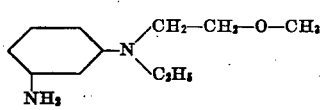

produced for example by alkylating m-nitraniline and subsequent reduction, or derivatives of aminophenols, such as, for example, the compound of the formula

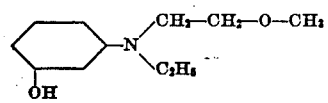

which may be obtained by diazotizing the aqueous solution of the corresponding amino-compound and replacing the diazo-group by an OH-group by heating.

The arylaminoalkylethers may be made, for example by condensing the corresponding amine, for instance aniline, ethyl-aniline, 1-amino-2-methoxy-5-methylbenzene or the like with an ether of a polyhydric alcohol which contains at least one non-etherified hydroxyl-group, or by treatment with a sulfuric acid ester or dialkyl ether sulfate or aryl-sulfonic acid ester of one of these (if necessary in the presence of an agent that binds acid, such as sodium carbonate, magnesia, chalk or the like), for instance with the paratoluenesulfonic acid ester of glycol-monomethylether or glycol-mono-ethylether, such as is obtained, for instance, by treating glycol-mono-methyl-ether or glycol-mono-ethylether with para-toluene sulfonic chloride. They can also be made by condensing a halogen-ether with the amine or by etherifying the corresponding aryl-amino-alcohol, or by causing an aryl-amino-halogenalkyl-compound to react with an alcoholate, or by causing an aryl-compound which contains in the nucleus a substituent capable of reacting to react with an aminoalkylether, for instance a halogen in ortho-position to a nitro-group.

The dyestuffs of the above general formula may also be obtained if the diazotizing component contains the characteristic

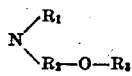

group wherein $R_1$, $R_2$ and $R_3$ have the meaning already indicated above. Such methods of producing these dyestuffs are described further below and are illustrated by examples.

As already mentioned these dyestuffs may be used for dyeing textiles of various kinds. They can of course also be used for other purposes, for example as pigments, for dyeing lacquers and varnishes, for dyeing paper, and so forth. They can also be used as intermediate products for the production of further azo-dyestuffs, and if required for the production of further dyestuff-groups.

The non-sulfonated dyestuffs are in particular used for dyeing esters and ethers of cellulose, and when brought into suitable form or suspended in a suitable medium, have a pronounced affinity for cellulose esters and ethers, particularly acetate silk, which they dye very fast tints.

The non-sulfonated dyestuffs may be brought into a finely subdivided form for example by grinding them with a dispersing agent, such as the sulfonated residue from the manufacture of benzaldehyde, a turpentine oil or the like, in the presence of water to produce a fine paste, or they may be converted in presence of further quantities of the aforesaid or other auxiliary substances, for example sulfite cellulose waste liquor, by cautiously drying them preferably in a vacuum, at a temperature not too high, into dry pulverizable preparations.

The following may further be mentioned for dyeing acetate-silk:—

Yellow to orange red tints are obtained by coupling aniline or para-nitraniline with N($\beta$-methoxyethyl)-aniline or N($\beta$-ethoxyethyl)-aniline; red to Bordeaux-red tints by coupling para-nitraniline, 4-nitro-ortho-anisidine or 2-chloro-4-nitraniline with N-ethyl-N($\beta$-methoxyethyl)-aniline; red violet tints to violet brown tints by coupling 5-nitro-ortho-aminophenol or 2,4-dinitraniline or 4,6-dinitro-ortho-anisidine with N($\beta$-methoxyethyl)-2-methoxy-5-methyl-aniline or N($\beta$-methoxyethyl)-2,5-dimethoxy-aniline. In all these dyestuffs the symbols A and B of the general formula

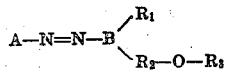

stand for benzene nuclei, and $R_1$, $R_2$ and $R_3$ have the meanings already indicated above.

The non-sulfonated dyestuffs may also be used for other purposes. For example, if the aminoazo-dyestuffs of the general formula

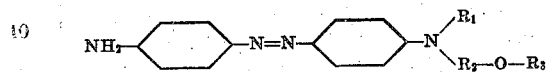

wherein $R_1$, $R_2$ and $R_3$ have the already indicated meanings, such as, for example, the 4-amino-4'-[N-ethyl-N-($\beta$-methoxyethyl)] aminoazo-benzene of the formula

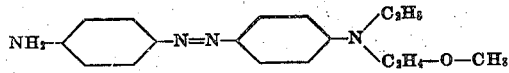

or the 4-amino-4'-N(di-$\beta$-methoxyethyl)-aminoazo-benzene, or the 4-amino-4'-[N-($\omega$-hydroxyethyl)-N($\beta$-methoxyethyl)]-aminoazo-benzene, are diazotized, and cotton, which itself has been prepared in known manner with arylides of 2,3-hydroxynaphthoic-acid, 2,3-hydroxyanthracene-carboxylic acid, hydroxycarbazole-carboxylic acid or hydroxybenzo-carbazole-carboxylic acid, is introduced into the diazo-solution thus obtained, the same is dyed fast black shades. Also in these dyestuffs wherein the characteristic

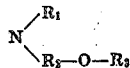

group, $R_1$, $R_2$ and $R_3$ having the meanings already indicated above, is present in the diazotizing component, and which correspond for example to the formula

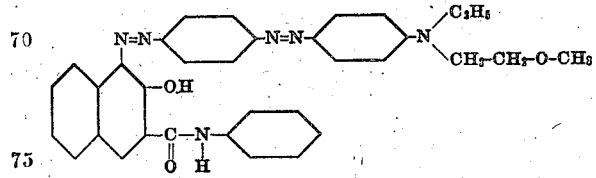

the symbols A and B of the above general formula are also benzene nuclei.

The sulfonated dyestuffs are used for dyeing wool, silk and cotton. The constitution of the dyestuffs is also here decisive for their application. Thus the coupling components mentioned on page 2 yield with sulfanilic acid yellow dyestuffs, with nitroanilinesulfonic acid orange to red dyestuffs which may be suitable for dyeing wool or silk. Diazotizing components, such as dehydrothiotoluidine-sulfonic acid, lead to dyestuffs suitable for dyeing cotton.

Compounds, such as 4-amino-1-[N-ethyl-N-($\beta$-methoxyethyl)]-amino-benzene, obtained by treating the N-ethyl-N-($\beta$-methoxyethyl)-aniline with nitric acid and subsequent reduction yield blue wool-dyestuffs when diazotized and coupled with peri-derivatives of the naphthalene, such as 1,8-dihydroxynaphthalene or 1,8-aminonaphtholsulfonic acids. If care has been taken, by further suitable substitution in the benzene nucleus, that an energetic diazotizing component is obtained, for example by introducing halogen or $SO_2$-aryl groups, blue dyestuffs may also be obtained with N-acidyl derivatives of the 1,8-aminonaphthol-sulfonic acids. The peri-derivatives of the naphthalene which come into question here are the 1,8-dihydroxynaphthalene-4-sulfonic acid, the 1,8-dihydroxynaphthalene-3,6-disulfonic acid, the 1,8-aminonaphthol-4-sulfonic acid, or the 3,6- or 4,6- or 2,4-disulfonic acids, and the N-acetyl, N-chloracetyl, N-benzoyl and N-para-toluene sulfonic derivatives thereof.

Blue dyestuffs are also obtained by treating with saponifying agents dyestuffs, such as the coupling products of the 1,8-dihydroxynaphthalene-4-sulfonic acid or the 3,6-disulfonic acid, with N-acidyl-derivatives of the 4-diazo-1-N-($\beta$-methoxyethyl)-amino-benzene. As acyl-group there comes into consideration here for example the acetyl-group. Similarly behaves the NO-group. In all these dyestuffs containing a naphthalene residue, for example in the dyestuff of the formula

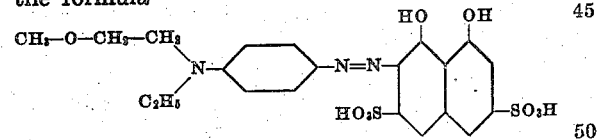

the benzene nucleus corresponds to the symbol B and the naphthalene nucleus corresponds to the symbol A of the general formula:

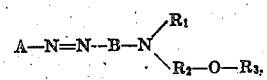

wherein the symbols A, B, $R_1$, $R_2$ and $R_3$ have the meanings already explained above. This general formula does not only correspond to monoazo-dyestuffs, but the nuclei A and B may also carry as substituents aryl—N=N—groups so that the formula applies also to disazo- and polyazo-dyestuffs.

Such products may be obtained by choosing as a coupling component containing the group

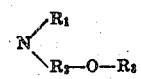

wherein $R_1$, $R_2$ and $R_3$ have the meanings already indicated above, such a component which is capable of coupling twice (for example a meta-phenylene-diamine or an aminonaphthol derivative). The coupling components containing the group

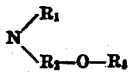

wherein $R_1$, $R_2$ and $R_3$ have the meanings already indicated above, may also be combined with such diazo compounds which already contain one or several azo-groups. This will for instance be the case when producing cotton dyestuffs which may, for example, possess the following constitution:—

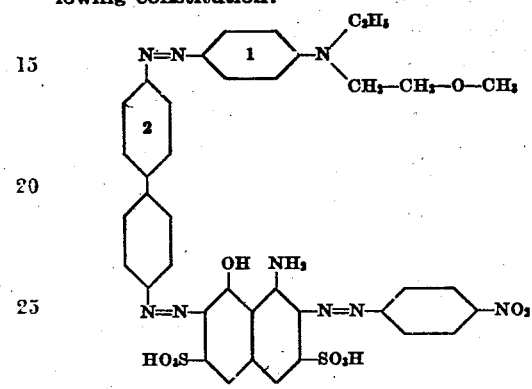

In such a dyestuff the benzene nucleus 1 corresponds to the symbol B and the benzene nucleus 2 to the symbol A. If the

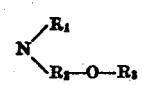

group, wherein $R_1$, $R_2$ and $R_3$ have the meanings already indicated above, is bound to a naphthalene nucleus, an aromatic nucleus of the naphthalene series corresponds to the symbol B. If the coupling components mentioned on page 2 are coupled with diazotizing components, such as diazotized 1-naphthylamine-4-sulfonic acid or the diazotized azo-dyestuff, which itself is obtained from diazotized 1-naphthylamine-6-sulfonic acid (1 mol.) and 1-naphthylamine-6-sulfonic acid (1 mol.), the symbol A or the symbols A and B correspond to aromatic nuclei of the naphthalene series. Such dyestuffs are also cited farther back in Example 7 of this specification.

The following examples illustrate the invention, the parts being by weight:—

Example 1

13.8 parts of finely pulverized para-nitraniline are stirred with 300 parts of water and the suspension is diazotized in the usual manner by means of 25 parts of concentrated hydrochloric acid and 7 parts of sodium nitrite. The diazo solution after addition of sodium acetate to neutralize the mineral acid is mixed with a solution of 17.9 parts of N-ethyl-N($\beta$-methoxyethyl)-aniline (made for example from mono-ethylaniline and the p-toluene sulfonic acid ester of glycol-mono-methylether or by etherifying N-ethyl-N($\omega$-hydroxyethyl)-aniline with a methyl-halide and sodium) in the necessary quantity of dilute hydrochloric acid. After a short stirring the formation of dyestuff is finished. The dyestuff thus obtained of the formula

is filtered and washed. It is a red powder which, after it has been brought into a fine state of sub-division by adding agents having dispersing properties, dyes acetate silk lustrous red tints. The N-ethyl-N($\beta$-methoxyethyl)-aniline may be made, for example, as follows:—

To a mixture of 121 parts of mono-ethylaniline with 58 parts of calcined sodium carbonate there are added, by drops, in the course of 3 to 4 hours and at a temperature of about 120-130° C., while intensively stirring, 230 parts of the p-toluene sulfonic acid ester of glycol-mono-methylether of the formula

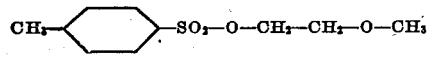

(obtainable in known manner by reaction of glycol-mono-methylether with para-toluene-sulfochloride and aqueous caustic soda solution). The reaction occurs with intense evolution of carbon dioxide and separation of sodium toluenesulfonate. Stirring is continued for some hours at about 130° C. and, after cooling, the whole is stirred with water; the oil thus separated is withdrawn from the aqueous portion in a separating funnel and then distilled in a vacuum. After a first running of mono-ethylaniline there distils N-ethyl-N($\beta$-methoxyethyl)-aniline of the formula

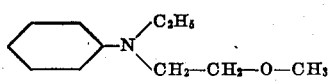

in the form of a water-clear oil of agreeable aromatic odor and of boiling point 93° C. under 2 mm. pressure.

Example 2

The diazo-solution made in the usual manner from 16.8 parts of nitro-anisidine $$(NH_2:OCH_3:NO_2 = 1:2:4)$$

is mixed with 13.6 parts of crystallized sodium acetate and then added to a solution of 17.9 parts of N-ethyl-N($\beta$-methoxyethyl)-aniline in dilute hydrochloric acid. The dyestuff thus obtained of the formula

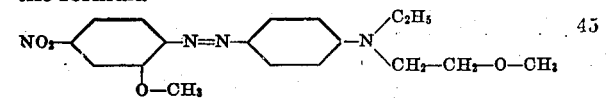

is a dark red powder which dyes acetate silk dark red tints.

Example 3

17.25 parts of 2-chloro-4-nitraniline are ground with water and diazotized by means of 25 parts of concentrated hydrochloric acid and 7 parts of sodium nitrite. The diazo-solution thus obtained is mixed with 13.6 parts of crystallized sodium acetate and allowed to flow into a solution of 17.9 parts of N-ethyl-N($\beta$-methoxyethyl)-aniline in dilute hydrochloric acid. The dyestuff of the formula

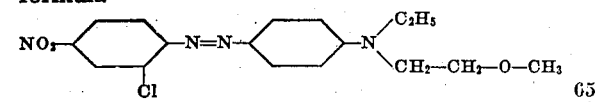

separates in the form of a red violet powder. It dyes acetate silk Bordeaux red tints.

Example 4

Into a solution of 195 parts of N-($\beta$-methoxyethyl)-2-methoxy-5-methyl-aniline in dilute hydrochloric acid there is allowed to flow a diazo-solution prepared in known manner from 183 parts of dinitraniline. When coupling has been completed by the addition of sodium acetate the dyestuff of the formula

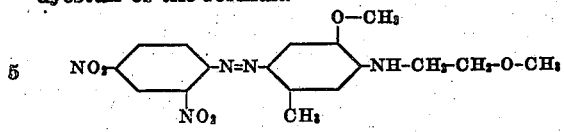

which has separated, is filtered. It is a dark violet powder, soluble in ethyl acetate to a violet solution and capable of dyeing acetate silk violet tints, which can be discharged to a pure white.

The N-(β-methoxyethyl)-2-methoxy-5-methyl-aniline of the formula

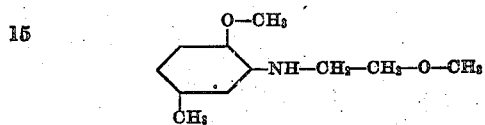

may be made, for instance, by adding in drops, in the course of 3 to 4 hours, 230 grams of the p-toluene sulfonic acid ester of glycol-monomethylether to a mixture of 137 parts of 1-amino-2-methoxy-5-methyl-benzene with 58 parts of calcined sodium carbonate at about 120° C. The mass is stirred for some hours at this temperature and worked up as described in Example 1; the desired ether is thus obtained in the form of a bright oil which boils at 108° C. to 110° C. under 2 mm. pressure.

A dyestuff dyeing acetate silk blue tints is obtained by coupling the diazotized 6-chloro-2:4-dinitraniline with the N-(β-ethoxyethyl)-1-aminonaphthalene. The dyestuff corresponds with the formula

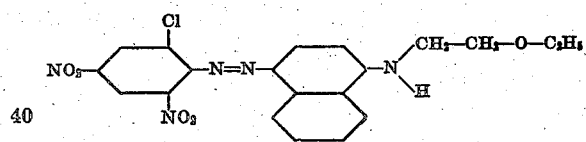

and forms a black powder which dissolves in acetic ester to a blue solution. The same coupling component combined with diazotized 1,8-aminonaphthol-3,6-disulfonic acid (which combination can also take place by first diazotizing the p-toluenesulfonic acid ester of the 1,8-aminonaphthol-3,6-disulfonic acid, then coupling and finally eliminating the p-toluenesulfonic acid radical by heating with alkalies) leads to a dyestuff whose sodium salt corresponds with the formula

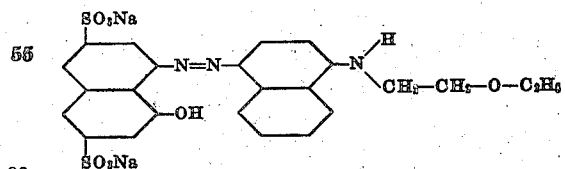

When dry and pulverized this dyestuff forms a dark blue powder which dissolves in water to a blue solution and dyes wool in an acid bath blue tints.

Example 5

19.5 parts of sodium-sulfanilate are dissolved in 200 parts of water and the solution is diazotized by means of 7 parts of sodium nitrite and 25 parts of concentrated hydrochloric acid. The diazo-solution is mixed with a solution of 17.9 parts of N-ethyl-N(β-methoxyethyl)-aniline. The dyestuff thus obtained of the formula

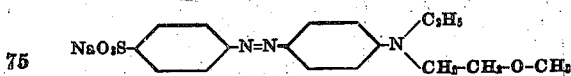

dyes wool in an acid bath yellow tints. It can also be used for producing printing effects on acetate silk.

Example 6

Cotton yarn is impregnated for ¼ hour at 20–25° C. with a solution containing per liter 6 grams of 2,3-hydroxynaphthoic acid-2'-methoxyanilide, 12 ccm. of caustic soda solution of 34° Bé., 7 ccm. of Turkey red oil, and 7 ccm. of formaldehyde solution of 40 per cent strength. The yarn is well wrung out and then developed in a solution neutralized with sodium acetate containing per liter 2 grams of diazotized 4-amino-3-chloro-6-methoxy-4'-[N-ethyl-N-(β-methoxyethyl)]-amino-azobenzene of the formula

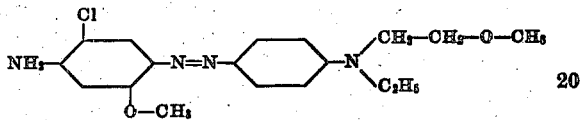

The goods are then rinsed and soaped. There are obtained very pure deep black tints of excellent fastness properties.

The dyestuff may also be produced in substance. It forms a black powder which dissolves in pyridine to a blackish solution.

What we claim is:—

1. Azo-dyestuffs of the general formula

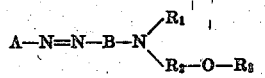

wherein A and B stand for nuclei of the benzene or naphthalene series, $R_1$ for hydrogen or an alkyl-group, $R_2$ for an aliphatic hydrocarbon radical consisting of at least two carbon atoms, and $R_3$ for an alkyl-group, which products form yellow, orange, brown, red, violet, blue or black powders, dissolve in solvents to yellow, orange, brown, red, violet, blue or black solutions, and dye textiles similar shades.

2. Azo-dyestuffs of the general formula

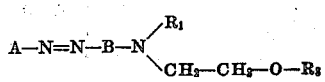

wherein A and B stand for nuclei of the benzene or naphthalene series, $R_1$ for hydrogen or an alkyl-group, and $R_3$ for an alkyl-group, which products form yellow, orange, brown, red, violet, blue or black powders, dissolve in solvents to yellow, orange, brown, red, violet, blue or black solutions, and dye textiles similar shades.

3. Monoazo-dyestuffs of the general formula

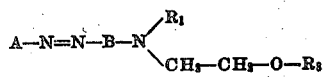

wherein A and B stand for nuclei of the benzene or naphthalene series, $R_1$ for hydrogen or an alkyl-group, and $R_3$ for an alkyl-group, which products form yellow, orange, brown, red, violet or blue powders, dissolve in solvents to yellow, orange, brown, red violet or blue solutions, and dye textiles similar shades.

4. Unsulfonated monoazo-dyestuffs of the general formula

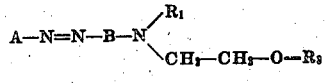

wherein A and B stand for nuclei of the benzene or naphthalene series, $R_1$ for hydrogen or an alkyl-group and $R_3$ for an alkyl-group, which products form yellow, orange, brown, red, violet or blue powders, dissolve in acetic ester to yellow, orange, brown, red, violet or blue solutions, and dye acetate artificial silk similar shades.

5. Unsulfonated monoazo-dyestuffs of the general formula

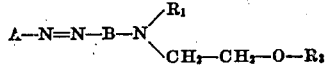

wherein A stands for a benzene nucleus and B for a nucleus of the benzene or naphthalene series, R₁ for hydrogen or an alkyl group and R₃ for an alkyl-group, which products form yellow, orange, brown, red, violet or blue powders, dissolve in acetic ester to yellow, orange, brown, red, violet or blue solutions, and dye acetate artificial silk similar shades.

6. Unsulfonated monoazo-dyestuffs of the general formula

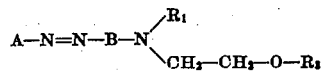

wherein A stands for a benzene nucleus carrying a nitro-group in p-position to the —N=N-group, B for a nucleus of the benzene or naphthalene series, R₁ for hydrogen or an alkyl-group, and R₃ for an alkyl-group, which products form orange, brown, red, violet or blue powders, dissolve in acetic ester to orange, brown, red, violet or blue solutions, and dye acetate artificial silk similar shades.

7. Unsulfonated monoazo-dyestuffs of the general formula

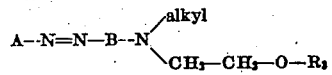

wherein A and B stand for nuclei of the benzene series, the nucleus A carrying a nitro-group in p-position to the —N=N-group, and R₃ stands for an alkyl-group, which products form orange, brown, red or violet powders, dissolve in acetic ester to orange, brown, red or violet solutions, and dye acetate artificial silk similar shades.

8. Non-sulfonated monoazo-dyestuffs of the general formula

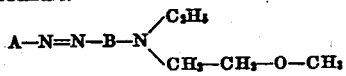

wherein A and B stand for nuclei of the benzene series, the nucleus A carrying a nitro-group in p-position to the —N=N-group, which products form scarlet, red to violet powders, dissolve in acetic ester to scarlet to red or violet solutions, and dye acetate artificial silk similar shades.

9. The non-sulfonated monoazo-dyestuff of the formula

which product forms a scarlet-red powder, dissolves in acetic ester to a scarlet-red solution and dyes acetate artificial silk fast scarlet shades.

10. The non-sulfonated monoazo-dyestuff of the formula

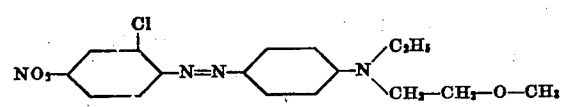

which product forms a red powder, dissolves in acetic ester to a blue-red solution and dyes acetate artificial silk pure blue-red-violet shades.

11. The non-sulfonated monoazo-dyestuff of the formula

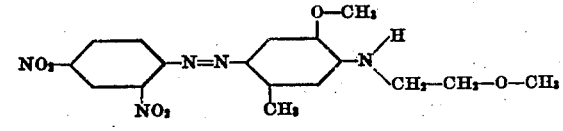

which product forms a dark violet powder, dissolves in acetic ester to a violet solution and dyes acetate artificial silk violet shades.

FRIEDRICH FELIX.
WILHELM HUBER.